United States Patent [19]
Cannon

[11] 3,741,098
[45] June 26, 1973

[54] CAMERA SYSTEM
[76] Inventor: James L. Cannon, 578 South Enota N.E., Gainesville, Ga. 30501
[22] Filed: May 11, 1971
[21] Appl. No.: 142,180

[52] U.S. Cl. .................................................. 95/37
[51] Int. Cl. ........................................... G03b 19/02
[58] Field of Search ....................... 95/36, 37; 96/41

[56] References Cited
UNITED STATES PATENTS

| | | | |
|---|---|---|---|
| 2,335,697 | 11/1943 | Reyniers | 95/37 |
| 2,074,088 | 3/1937 | Kurtz | 95/37 |
| 50,284 | 10/1865 | Shive | 95/36 |
| 3,318,218 | 5/1967 | Yax | 95/36 |
| 1,813,436 | 7/1931 | Bhosys | 96/41 |
| 897,733 | 9/1908 | Goddard | 95/37 |
| 2,584,311 | 2/1952 | Wells | 95/37 |

Primary Examiner—John M. Horan
Attorney—Newton, Hopkins & Ormsby

[57] ABSTRACT

A camera system in which two distinct photographs are produced in juxtaposition with respect to each other on a single frame from two successive images projected thereon. The camera structure includes a camera with a lens which is shiftable laterally between two positions. A nonactinic background is provided for the subject and means are provided for positioning the object in two distinct positions for successive exposures.

The second embodiment includes a camera in which the film carrier is shiftable laterally and a background for the object is provided, the background having outer panels of a nonactinic nature and a central panel which is actinic in nature. The subject is disposed before the actinic panel for successive photographs along the identical center line.

5 Claims, 8 Drawing Figures

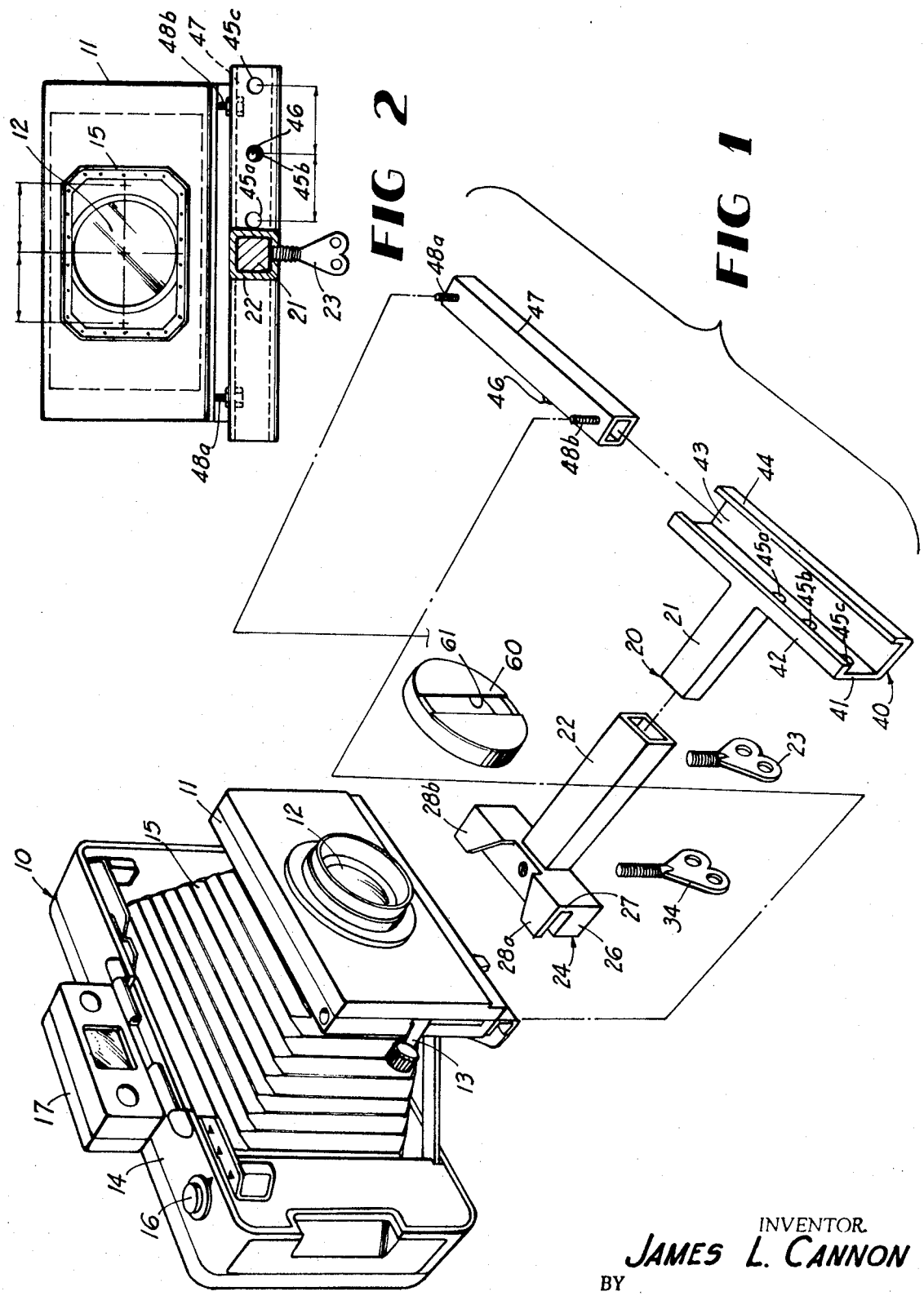

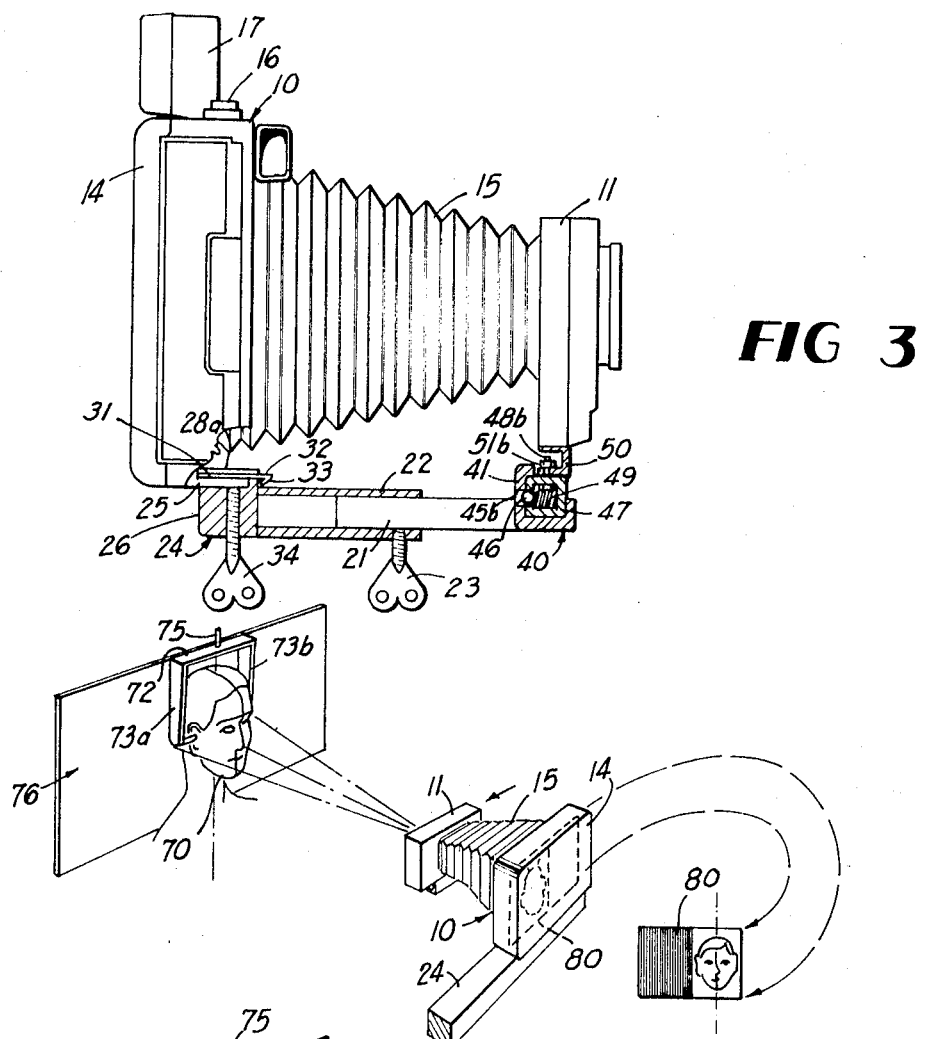
FIG 3
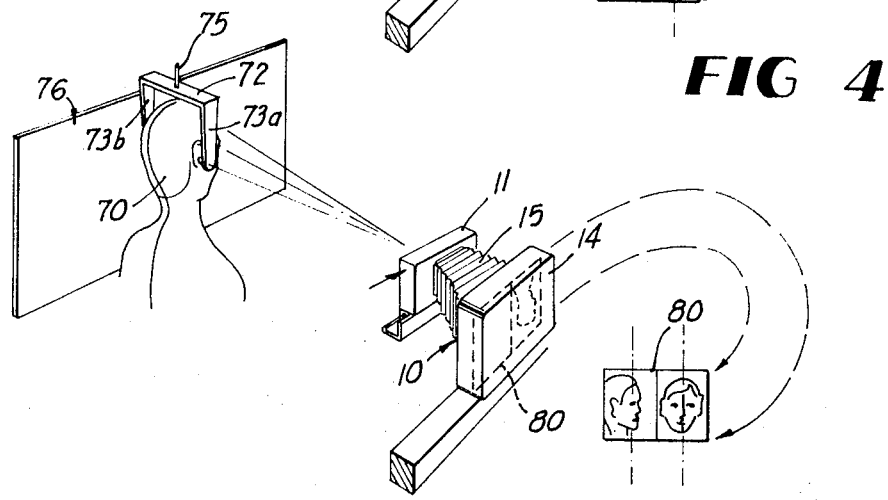
FIG 4
FIG 5

CAMERA SYSTEM

BRIEF SUMMARY OF THE INVENTION

In the past, efforts have been made to produce a camera which will produce multiple images on a single frame of photographic material. This has usually been accomplished by having a masking device over the film plate which allows specific sections of the plate to be exposed as desire or by having a masking device over the lens so that light entering through the lens may be controlled in such a way as to enter specific sections of the film plate to be exposed.

Both methods made no attempt to shift the optical axis of the lens each time an exposure is made so that accurate symmetrical close-up images may be produced, such as a frontal or lateral view of a persons's head.

In the practice of orthodontic dentistry, it is desirable to photograph a patient, quite accurately, in full face and profile, before treatment and subsequently as treatment progresses. In such a way, the external results of treatment can be demonstrated. In the past, to utilize a rapid development type camera such as a "Polaroid Land" camera, it has been necessary to take separate photographs. This necessitated the taking of two separate photographs, each time the subject was photographed. These photographs had to be marked to indicate the pairs and were usually placed in a file folder. Thus, the photographs were more expensive and constituted a greater maintenance and storage problem.

Briefly described, the present invention, which obviates difficulties described above, includes a "Polaroid Land" camera provided with a mechanism for shifting the lens to opposite sides of a center line where the lens is normally disposed. In conjunction with this "Polaroid" camera is a nonactinic background. When the lens is centered, a conventional photograph can be made of an object. When, however, the lens is shifted either to one side or the other, and the object appropriately aligned therewith, light rays reflected from the object will be directed to only a one-half portion of the entire frame. When the lens is shifted to an opposite position, and the subject or patient appropriately positioned in a second position, a second exposure of the same film can be made so that the image of the patient or subject projected on a second half position of the same film frame. When developed, therefore, the print will have two images, one on one side and one on the other side of the print.

In the second embodiment, the same sort of print is developed; however, the background consists of three screens or panels, the two outer panels being nonactinic in nature and the central panel being either actinic or nonactinic, as desired. The film carrier of this second embodiment is shiftable between two extreme positions so as to permit the focusing of the image of the central panel on the first half of a film and then, subsequently, on the second half of the same film.

Accordingly, it is an object of the present invention to provide a film system which will permit the projecting of two separate images upon successive portions of a film, without the necessity of masking the film or lens so as to eliminate inadvertent exposure of the particular film.

Another object of the present invention is to provide a camera system which is particularly suited for photographing a persons head so that a frontal and lateral view may be placed on a single film.

Another object of the present invention is to provide a camera system which is inexpensive to manufacture, durable in structure, and efficient in operation.

Another object of the present invention is to provide a camera system in which a conventional camera can be adapted to take multiple photographs on a single frame.

Another object of the present invention is to provide a camera system which will accurately depict a persons's head in a plurality of positions.

Other objects, features and advantages of the present invention will become apparent from the following description taken in conjunction with the accompanying drawings wherein like characters of reference designate corresponding parts throughout the several views.

DESCRIPTION OF DRAWING

FIG. 1 is an exploded prospective view of the camera assembly constructed in accordance with the present invention;

FIG. 2 is a vertical sectional view of the camera assembly illustrated in FIG. 1;

FIG. 3 is a side elevational view partially broken away of the camera assembly disclosed in FIG. 1;

FIG. 4 is a schematic prospective view of the camera system of the present invention, taking a first picture;

FIG. 5 is a view similar to FIG. 4 and showing the camera system taking the second picture;

DETAILED DESCRIPTION

Figure 6:
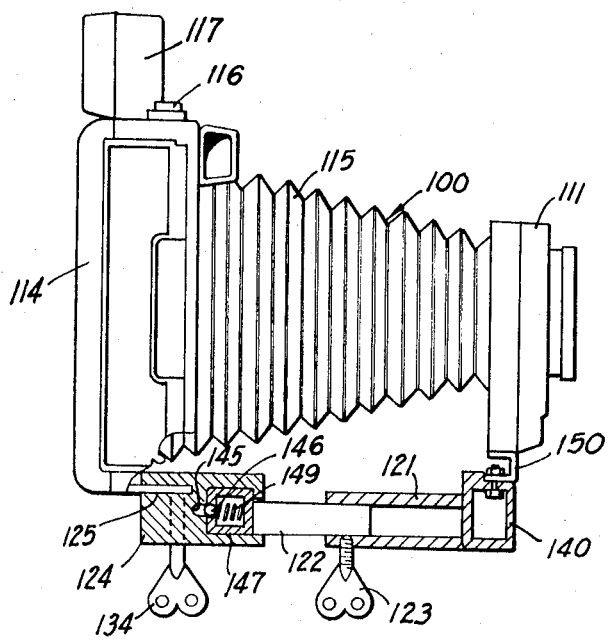
FIG. 6 is a side elevational view of the camera assembly of the second embodiment of the present invention.

Referring now in detail to the embodiments chosen for purposes of illustrating the present inventions, numeral 10 denotes generally a conventional camera which, in the present embodiment, is an "Automatic 100, Polaroid Land Camera." In more detail, the camera 10 is a rapid development camera and includes a lens carrier 11 within which is a lens 12 and a cocking lever 13. A film or cassette carrier 14 is connected to the lens carrier 11 by a bellows 15. A shutter button 16 trips the shutter of lens 12 after the cocking lever 13 has been depressed. A pivotally mounted viewer or view finger 17 is carried on the film carrier 14. This viewer 17 also containing a range finger (not shown). The mechanism thus far described is entirely conventional in the "Automatic 100, Polaroid Camera." This camera 10 usually comes equipped with arms which manipulate the lens carrier 11 so as to bring the lens 12 into position to focus an image on the film 80 within the camera 10. This mechanism is removed so that the lens carrier 11 is free to be moved both forwardly and rearwardly and sidewise.

As a substitute for the removed conventional equipment, I have provided an extensible support frame 20 which supports the flat lens carrier forwardly and rearwardly and in its plane, sidewise. The support frame 20 and the camera 10 constitute the camera assembly.

The extensible lens carrier support frame 20 includes a pair of telescoping bars, i.e., a front slide bar 21 formed of rectangular metal and a rear bar 22 which is a larger rectangular tubular member, slideably receiving the bar 21. A set screw 23, which threadedly extends through the bottom face of bar 22, locks the two bars together.

The inner end of bar 22 is carried by a transversely disposed support arm 24, one end of which forms a base removably receiving the lower ledge 25 of the film carrier 14, as seen in FIG. 3. For this purpose the outer end of arm 24 is slotted to provide, as best seen in FIG. 1, a rearwardly opening channel having a lower plate 25, an upstanding web 27 and a bifurcated upper plate. The upper plate consists of two spaced leaves 28a and 28b in a common plane. The leaves 28a, 28b project rearwardly from web 27 so as to overlie, in cantilever fashion, the upper flat surface of plate 26. The inner opposed edges 29a, 29b of leaves 28a, 28b taper forwardly to a central notch 30 in web 27.

As is usual in cameras of this type, there is a spring clip detent 31 mounted on the central inner side of ledge 25. Detent 31 is a flat rectangular spring with a hook latch 32 overlying the forward edge of ledge 25. Latch 32 has a downwardly and forwardly facing camming surface 33 which permits latch 32 to be urged upwardly and then spring back into place when the cover (not shown) is placed on the film carrier 14.

In like manner, detent 31 functions to aid and hold the camera in place on arm 24. When the arm 24 receives ledge 25, the plate 24 is received below the ledge 25 as leaves 28a, 28b are received above ledge 25 whereby the web 27 abuts the forward edge of ledge 25. In such a position, leaves 28a, 28b have straddled detent 31 so that latch 32 overlies web 27. A set screw 34, threadedly passing through plate 26, secures the carrier 14 in place.

Secured to the forward end of the extensible bar 21 is a transversely extending slide carrying bar 40. This bar 40 is a square tubular member, one corner portion of which is removed, thereby providing a channel with a vertical web 41, an upper horizontal flange 42 extending forwardly the upper edge of web 41 and a lower flange 43 extending forwardly from the lower edge of web 41. The forward end of flange 43 is provided with an upstanding rib 44.

The web 41 is provided with three accurately, equally spaced, holes or apertures 45a, 45b and 45c which selectively receive a detent ball 46 on a slide bar 47 carried in bar 40. The detent ball 46 is yieldably urged into one of the holes 45a, 45b or 45c by a coil spring 49, carried within the bar 47. Thus the slide bar 47 may be shifted laterally to any of three positions in bar 40.

Bar 47 is a hollow tubular member, square in cross-section. Bolts 48a, 48b pass upwardly through the upper surface of bar 47 for securing a flange of channel member 50 in place thereon. The other flange of channel member 50 is secured to the bottom edge of the lens carrier 11 and supports the film carrier 11 in a common vertical plane with slide bar 47. Hence, when the slide bar 47 is shifted, the lens carrier 11 and lens 12 is shifted by a like amount. The shifting of ball 46 to hole 45a, 45b or 45c positions the lens 11 selectively in front of the first half of the film to be exposed, in front of the center of this film or in front of the second half of the film to be exposed, as the case may be.

In FIG. 2 the distance from point C to point L or R, which are respectively the centerlines of holes 45b, 45a and 45c, is about 2.7 centimeters for film which is about 10.8 centimeters long. Therefore, the lens 12 is shifted by 2.7 centimeters each time ball 46 is shifted from one point to the next. When the ball 46 is in center hole 45b, the lens 12 is on the central or main optical axis of the camera 10, as is conventional. When, however, the ball 46 is in either hole 45a or 45c the optical axis of the lens is shifted left or right by 2.7 centimeters to position the lens 12 in front of one half or the other half of film 80.

So as to reduce the width of the background the lens 12 is provided with light shield 70 which is a lens cover having a vertical slit 61, therein. The lens cover 60 fits over the rim of lens 12.

In FIGS. 4 and 5 it will be seen that the base or arm 24 extends laterally and can be supported from a work stand or the like, such as is common in dental offices. The camera 10 may thus be positioned a fixed distance from the subject 70 and, once being focused properly, through extending or retracting arm 21, needs no adjustment. The subject 70 is positioned in place by means of an inverted U-shaped head bracket 72 having a pair of downwardly extending arms 73a and 73b which contact the ears of the subject. The bracket 72 is rotatable about the vertical axis of its pin 75.

Behind the subject and in front of the camera is a rectangular area forming a nonactinic background or panel 76 which may be a sheet or screen of black velvet or some other non-reflecting In use, the lens 12 is shifted first to its left hand position, such that the ball 46 is in the left hold 45a. In such a position, a symmetrical photograph of the subject 70, full face, as illustrated in FIG. 4, can be taken. When developed, the film 80, seen in FIG. 4, has the subject's photograph on the left half there of of film 80 or the resulting print.

When, however, the subject 70 is rotated from its front view as seen in FIG. 4 to a side view as seen in FIG. 5, the center line of the subject 70, i.e., face to be photographed in profile, shifts approximately the same distance which the lens 12 is shifted and, hence, is positioned properly, simply by rotating the bracket 72. Furthermore, the lens 12 is shifted so that the ball 46 is in the hole 45c. When the picture is taken it will come out on the film 80 on the right side, as illustrated in FIG. 5. It is, therefore, seen that a front face and side view of a subject 70 may be made utilizing the same film frame.

SECOND EMBODIMENT

Figure 7:
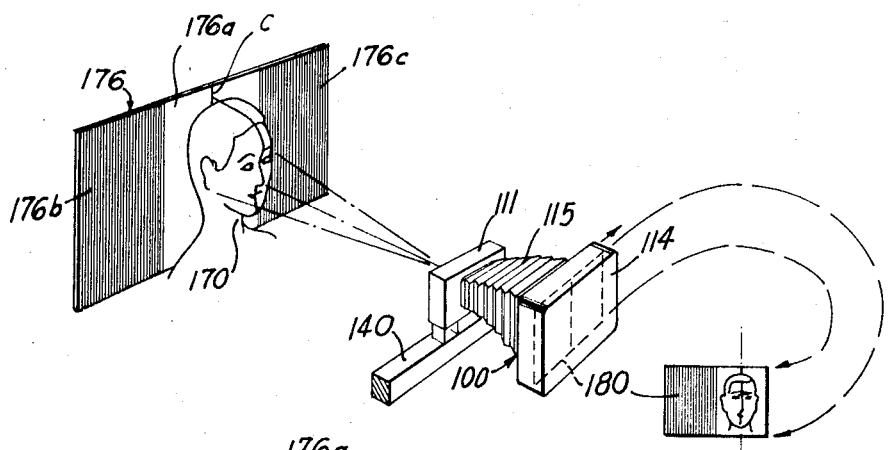
FIG. 7 is a schematic prospective view of the camera system of the second embodiment taking a first picture.
Figure 8:
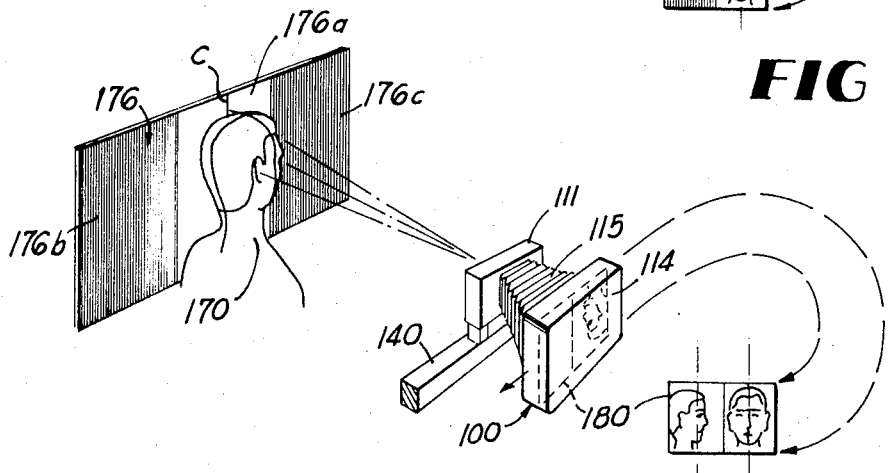
FIG. 8 is a view similar to FIG. 7 showing the camera system of the second embodiment taking a second picture.

In the second embodiment, as depicted in FIGS. 6, 7 and 8, the camera 110 is supported on essentially the same structure as the camera 10 in the preceding embodiment, except that the lens carrier 111 is held in a fixed position and the film carrier 114 is shifted.

In more detail, the camera 100 includes a lens carrier 111, a film carrier 114, a bellows 115, a shutter button or trigger 116, and a view finder 117. The lens carrier 111 is mounted on a channel member 150 which, in turn, is carried by a transverse bar 140. The central position of transverse bar 140 is provided with a longitudinally extending slide bar 121 which telescopically receives a bar 122, the two bars being locked together by a set screw 123.

The free end of bar 122 carries a transverse bar 147 which has a ball 146 mounted therein, the ball 146 being urged outwardly by a spring 149. A channel member 124 slideably carries bar 147 and is removably positioned on the ledge 125 of the film carrier 114, being secured in place by a set screw 134. Three laterally spaced apertures, such as aperture 145, is adapted selectively to receive the ball 146. The bar 147 is slideable laterally within the base 124 so that the ball 146 can be selectively positioned in any one of the three apertures 145. Hence, the film carrier 114 may be shifted between three laterally spaced positions.

The distance between the apertures 145 is approximately the same as the distance between the apertures 45a, 45b and 45c. Likewise, one aperture 145 aligns the film carrier 114 and the lens carrier 111 along a major central optical axis, while the other two apertures, on opposite sides of the central aperture 145 to permit shifting to the left or right of the film carrier 114 to thereby shift the optical axis to the left or right, as desired. Otherwise, the camera 100 is identical to the camera 10.

As seen in FIGS. 7 and 8, when the camera 100 is sued, it is mounted on a fixed arm, such as the extension of bar 140 and a three panel background 176 is provided in which the central panel 176a of the background 176 forms either an actinic or nonactinic panel 176a depending on the background desired. The outer panels or wings 176b and 176c form nonactinic panels.

In this particular embodiment, the subject 170 is positioned at the centerline C of panel 176a and simply rotates himself from a full face position of FIG. 7 to a profile position, of FIG. 8. The lens (not shown) of this embodiment remains stationary and hence it is necessary to shift the film 180, i.e., the film carrier 114 so as to position the first one-half of the film in front of the lens and then the other half of the film 180 in front of the lens. When the first picture is taken, an exposed film is produced with the image received on only one-half of the film 180. When the second picture is taken, the image is received on the second half of the film 180.

I claim:

1. A camera system comprising a camera including a film support means, a lens, a lens support means for supporting said lens in a position for exposing light through said lens onto a film supported on said film support means, means for fixedly maintaining one of said support means, means for adjustably mounting the other said support means for sidewise movement with respect to said fixedly mounted support means for selectively positioning said lens and a first increment of film in optical alignment and thereafter positioning said lens and a second increment of film in such alignment, and a screen of nonactinic material mounted at a fixed predetermined distance from said camera and providing a background for an object to be photographed, and a rotatable bracket mounted adjacent said screen for positioning an object to be photographed in a desired position with respect to said screen and camera.

2. A camera system as in claim 1 wherein the film support is fixed and the lens is movable and wherein said rotatable bracket is so placed that it will hold an object directly in front of the lens when the latter is in one of its side positions and that when the lens is moved to its other side position the rotation of the bracket will place the object directly in front of the lens in such other side position.

3. A camera system comprising a camera including a film support means, a lens, a lens support means for supporting said lens in a position for exposing light through said lens onto a film supported on said film support means, means for fixedly maintaining one of said support means, means for adjustably mounting the other said support means for sidewise movement with respect to said fixedly mounted support means for selectively positioning said lens and a first increment of film in optical alignment and thereafter positioning said lens and a second increment of film in such alignment, and a screen formed of nonactinic material mounted at a fixed predetermined distance from said camera and providing a background for an object to be photographed, said adjustable mounting means comprising a fixed member provided with an elongated groove, a second member snugly but slidably mounted in said groove, and a detent for holding said members selectively in any one of three relative positions in which the light passing through the lens will be directed respectively to one side of the film, to the middle section thereof and to the other side thereof, said detent comprising a spring pressed ball mounted in said slidable member, said fixed member being provided with indentations at each of three predetermined positions adopted to receive said ball and to hold said slidable member fixed in said groove; and a rotatable bracket mounted adjacent said screen for positioning an object to be photographed in a desired position with respect to said screen and camera.

4. A camera system as in claim 3 wherein the film support is fixed and the lens is movable and wherein said rotatable bracket is so placed that it will hold an object in front of the lens when the latter is in one of its side positions and that when the lens is moved to its other side position the rotation of the bracket will place the object directly in front of the lens in such other side position.

5. A camera system as in claim 3 further including a lens cover fitting over the lens and having a vertical slit therein.

* * * * *